T. J. KING.
BUCKET HANDLE.
APPLICATION FILED AUG. 30, 1910.
1,005,556.
Patented Oct. 10, 1911.
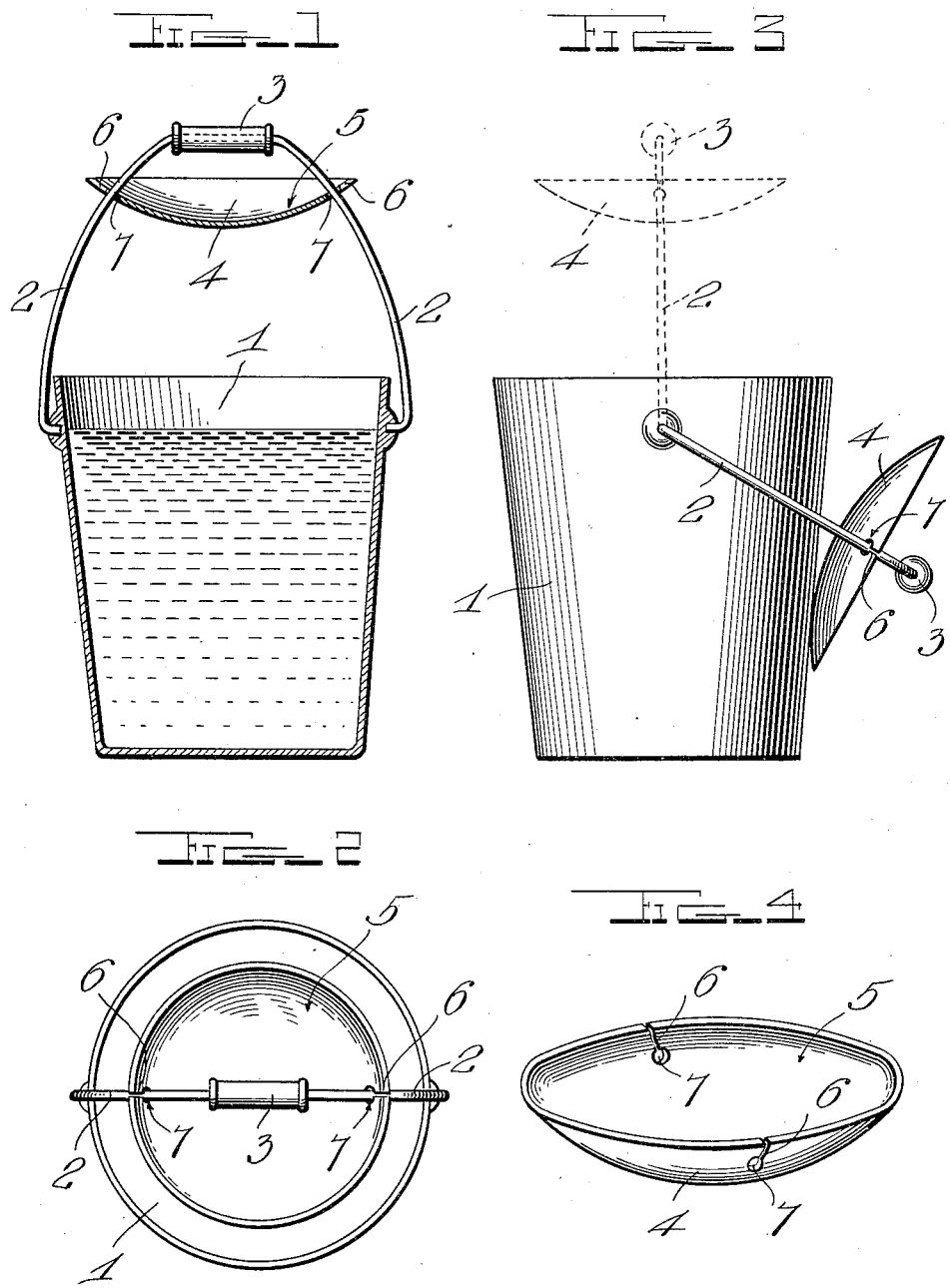

UNITED STATES PATENT OFFICE.

THOMAS J. KING, OF RICHMOND, VIRGINIA.

BUCKET-HANDLE.

1,005,556.  Specification of Letters Patent.  Patented Oct. 10, 1911.

Application filed August 30, 1910. Serial No. 579,678.

*To all whom it may concern.*

Be it known that I, THOMAS J. KING, a citizen of the United States, residing at Richmond, in the State of Virginia, have invented certain new and useful Improvements in Bucket-Handles, of which the following is a specification.

This invention relates to improvements in bucket handles and more particularly for those used on water or milk buckets.

In carrying a bucket of water or milk, it is usual to grasp the wooden handle piece of the bail and as a result of this the filth and perspiration from the hands, often carrying disease germs, are ground off the hands or handle piece and fall into the milk or water. The handle piece referred to, unless scoured several times daily, must necessarily carry certain particles of filth or germs, which to some extent falls into the bucket when the handle is raised and more especially when the hand grasps the handle piece.

The primary object of this invention is to provide a handle with a guard cup or receptacle which may be conveniently attached to the bail immediately under the handle piece, so that any filth or perspiration that drops or falls from the handle piece or hands will fall into said cup or receptacle and the contents of the bucket will be thus kept pure.

With the foregoing and other objects in view, the invention consists in the novel features of construction, combination and arrangement of parts, illustrated in the drawings and more particularly pointed out in the appended claim.

In the accompanying drawings, Figure 1 is a side elevation of a bucket with its bail equipped with my improved guard cup or receptacle, the handle raised. Fig. 2 is a plan view of Fig. 1. Fig. 3 is a view similar to Fig. 1 with the bail lowered, and Fig. 4 is a perspective view of the bail and guard cup, shown on an enlarged scale.

Referring to the drawings for a more particular description of the invention, 1 indicates the bucket, 2 the usual bail, 3 the handle piece and 4 the guard cup or receptacle.

The guard cup or receptacle 4 may be constructed of tin, iron, copper, aluminum or other suitable metal or even of wood. This cup is in approximately the form of a bowl with its concave surface 5 arranged upwardly. In practice the cup is suitably attached to the bail 2 immediately under the handle piece 3 and in position to catch any filth or perspiration that may fall from the hands or is ground or rubs off of the handle piece 3 when the bucket is carried. To provide for the convenient attachment of the guard cup to the bail 2, the former is provided in its edge and at diametrically opposite points with the slits 6 formed at their inner termini with eyes 7 to receive the ends of the bail. When the handle is raised, the guard cup assumes the position shown in Fig. 1 and when the handle is released, the guard cup or receptacle swings down against the side of the bucket. The guard cup may be made in various sizes and shapes and of any suitable metal or wood, as desired.

From the foregoing description taken in connection with the drawings, it is thought that the construction and advantages of this invention will be readily understood without requiring a more extended explanation.

Having described my invention, what I claim as new, is:—

A concavo-convex bowl shaped guard cup or receptacle for bucket handles provided in its edge at diametrically opposite points with slits provided at their inner termini with eyes to receive the bail of the bucket whereby the cup or receptacle is detachably secured to the bail immediately under the handle piece and may be swung down with the bail against the side of the bucket.

In testimony whereof I affix my signature in presence of two witnesses.

THOMAS J. KING.

Witnesses:
 MARGARET DEVINE,
 LAWRENCE HANCOCK.